United States Patent
Wyser

(10) Patent No.: US 7,294,430 B2
(45) Date of Patent: Nov. 13, 2007

(54) BATTERY HAVING A WOUND ELECTRODE ELEMENT

(75) Inventor: Paul J. Wyser, Appenzell (CH)

(73) Assignee: Wyon AG (CH)

( * ) Notice: Subject to any disclaimer, the term of this patent is extended or adjusted under 35 U.S.C. 154(b) by 351 days.

(21) Appl. No.: 10/660,901

(22) Filed: Sep. 12, 2003

(65) Prior Publication Data

US 2004/0072063 A1 Apr. 15, 2004

(30) Foreign Application Priority Data

Sep. 16, 2002 (EP) .................................. 02405804

(51) Int. Cl.
*H01M 4/00* (2006.01)
*H01M 2/28* (2006.01)

(52) U.S. Cl. ........................ 429/94; 429/161; 429/170; 429/211; 429/178

(58) Field of Classification Search .................. 429/94, 429/170, 178, 161, 211, 163, 186, 176
See application file for complete search history.

(56) References Cited

U.S. PATENT DOCUMENTS

| | | | |
|---|---|---|---|
| 3,384,857 A | | 5/1968 | Stoutenburgh |
| 4,040,938 A | * | 8/1977 | Robertson .................... 204/283 |
| 4,322,484 A | * | 3/1982 | Sugalski ........................ 429/94 |
| 5,707,758 A | | 1/1998 | Iwatsu et al. |
| 5,958,620 A | * | 9/1999 | Nagaura ...................... 429/164 |
| 6,071,638 A | | 6/2000 | Fradin |
| 6,399,237 B1 | * | 6/2002 | Souliac et al. ................ 429/56 |

FOREIGN PATENT DOCUMENTS

| | | | |
|---|---|---|---|
| EP | 0 822 605 A2 | | 7/1997 |
| EP | 1 100 138 A1 | | 11/1999 |
| EP | 1 067 610 A1 | | 6/2000 |
| EP | 1100138 | * | 5/2001 |

* cited by examiner

*Primary Examiner*—Raymond Alejandro
(74) *Attorney, Agent, or Firm*—Jacox, Meckstroth & Jenkins

(57) ABSTRACT

In a battery having a wound electrode element which is made contact with by means of a pin, a contact connection is fitted on the outer face and is electrically connected to the pin which is arranged in the housing. The connection between the pin and the contact connection can also be tightened mechanically. In consequence, the pin can be used at the same time as the holding element for the wound electrode, which leads to space being saved within the battery housing. Furthermore, the connection which can be tightened mechanically can be produced very easily, is robust and is scarcely susceptible to corrosion. It also allows a seal, which is impermeable to gases, for the battery interior. The battery is particularly suitable for mobile small and miniature appliances which draw a high current, so that their battery must be replaced frequently.

13 Claims, 3 Drawing Sheets

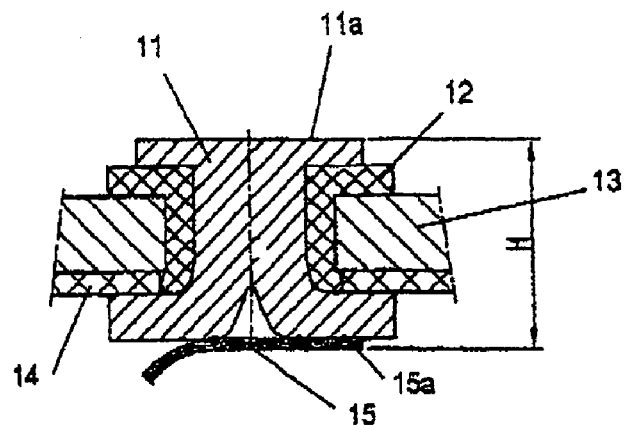
Figure 1A (Prior Art)
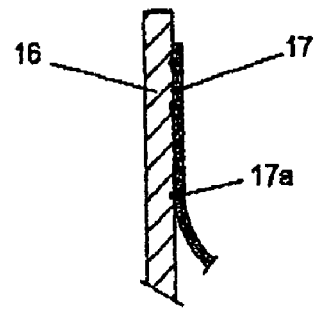
Figure 1B (Prior Art)
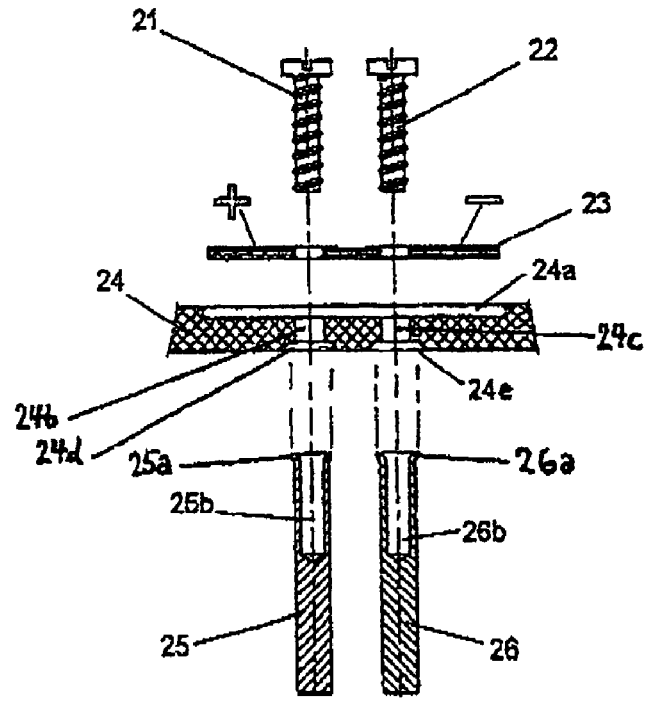
Figure 2A

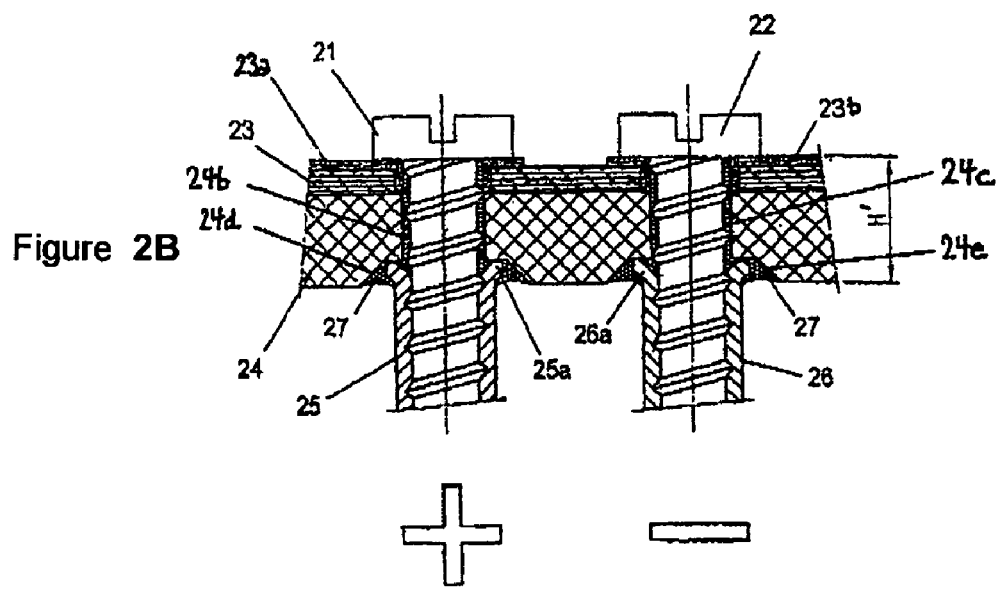
Figure 2B
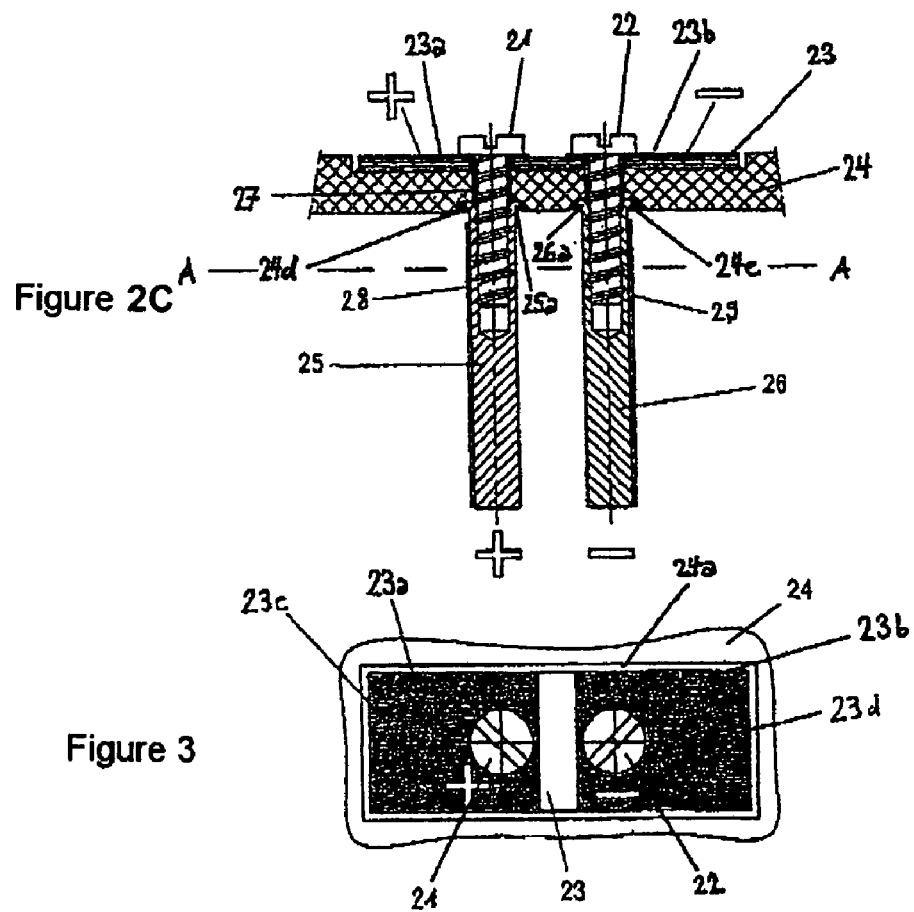
Figure 2C
Figure 3

BATTERY HAVING A WOUND ELECTRODE ELEMENT

BACKGROUND OF THE INVENTION

1. Technical Field

The invention relates to a battery having at least one wound electrode element and at least one pin for making contact with the electrode element in a housing, and having at least one contact connection which is fitted to an outer face of the housing and is electrically connected to the pin which is arranged in the housing.

2. Description of Related Art

Electronic appliances are becoming increasingly widely used all the time. At the same time, they can be produced in an ever more compact form. In the case of miniaturized appliances such as these, for example those which a user carries with him or her over a lengthy period or all the time (such as hearing aids, insulin pumps or other medicament dispensers, etc), it is important for the battery for supplying power likewise to be as compact as possible, but at the same time also to be powerful, that is to say to have as high a ratio as possible between the capacity and the volume. Owing to the continuous use of appliances such as these, their miniaturization (and hence the batteries which can be used) and their power demand, which in some cases is nevertheless high, the batteries must be regularly (often daily) removed and charged.

EP 1100 138 discloses a wound battery which has a space-saving design and thus allows a large capacity with a small space requirement. The electrical connection is in this case formed by small tubes which project into the housing and are at the same time used as mounts for the electrode winding, which is impregnated with electrolyte.

The support for the small tubes on the battery base that is required in this case for mechanical reasons also, however, leads to more loss of space. Furthermore, the use of pins which project into the housing for making electrical contact is not suitable for appliances whose batteries must be replaced frequently, because the removal and reinstallation process is cumbersome and the mechanical loads on the battery can lead to wear after a certain time, making the battery unusable or endangering the battery safety and reliability.

SUMMARY OF THE INVENTION

The object of the invention is to specify a battery which can be used for the technical field mentioned initially, has a space-saving design and has contact surfaces which make it easier to remove the battery from an appliance, and to reinstall it, frequently.

The object is achieved by the features of claim 1. According to the invention, a connection which can be tightened mechanically is formed between the contact connection on the outer face of the housing and the pin for making contact with the electrode element in the interior of the housing.

A connection such as this on the one hand provides a contact pressure between the connecting element and the contact connection which means that the electrical power is transmitted to the contact connection without any significant loss and without any corrosion of the connecting element. On the other hand, a connection such as this means that the pin for making contact with the electrode element in the interior of the housing is held robustly on the housing wall. If the electrode element is wound around the pin, it is thus also fixed on the housing wall. There is therefore no need for any additional holders on the opposite housing wall, thus making it possible to enlarge the active volume which is available, for example, for electrochemically active components. The connection which can be tightened also means that the battery interior is sealed in a gas-tight manner from the exterior. The contact connection on the outer face of the housing allows contact to be made easily with the appliance which is intended to be supplied with current, and to make contact with a charger for charging the battery. The contact connection can be largely matched to the requirements of this appliance in terms of shape, size, material and arrangement of the contact surfaces.

The connection which can be tightened is preferably formed by a screw connection. A screwed bushing allows a high contact pressure for the contact connection on the outer face while, at the same time, as a result of the large surface area of the thread and screw, offering a good contact for the pin in order to make contact with the electrode element in the interior of the housing. Finally, the production and recycling of the battery according to the invention are simplified by a screw connection, since a screw connection such as this can be tightened, and where necessary released again, in a simple manner.

As an alternative to the screw connection, it would also be possible, for example, to provide a spring mechanism, which forces the pin into a contact connection holder that projects into the housing, and thus fixes it. For this purpose, in order to make contact between the electrode element and the connecting element, the pin could be in the form of a bayonet connection, which interacts with a corresponding opposing piece, which forms the contact connection or is connected to it. In order to make contact with the electrode element, the pin can optionally be provided with a head which rests on the outer face of the housing, and with a recess into which a clamping wedge is driven on the inside of the housing, until the contact pressure between the head and the housing reaches the desired level.

For certain applications, it may be expedient for the contact connection, that is to say the surface which is touched by an external element in order to make electrical contact, to be formed by the head of the screw. On the one hand, this reduces the number of components, while on the other hand there is no electrical connection between the screw and an additional contact element, thus reducing power losses and reducing the risk of corrosion. If the screw head is at the same time used to make contact between an appliance and the battery, it may be expedient to choose its diameter to be larger than would be necessary for mechanical reasons, so that the contact area which is formed by the end surface and the outer surface of the screw head is enlarged.

The contact connection is advantageously formed from gold or nickel, or is gold-plated or nickel-plated. This improves the electrical contact with the appliance and reduces the corrosion, thus lengthening the life of the battery. If the screw head forms the contact connection, this may be coated entirely or partially with a gold or nickel layer. The screw can optionally be formed from solid nickel.

The battery is preferably designed such that two pins are accommodated in the housing, and such that two contact connections are provided on the outer face of the housing, and are isolated from the housing. The housing is thus floating and may, in particular, be produced from plastic that is impermeable to gas. This allows simpler and lower-cost production, prevents corrosion of the housing, and reduces the weight of the battery. However, the greatest advantage of this solution is that there is no need for costly insulators on the inner face of the housing (from the anode or, for example, sealing sleeves to provide a contact bushing for the negative pole), so that the distance between the outer contact surface and the usable internal area can be reduced, which results in a major space saving.

The pin may at least partially be in the form of a small tube which has a broadened area at one end, which is used to support it on an inner wall of the housing. Even in the case of pins with a small diameter and thus occupying a small amount of space, the broadened area means that the contact surface area between the pin and the housing is sufficiently large that the contact pressure can be chosen such that the contact bushing is gas-tight. For example, a screw for the screw connection can be screwed into the interior of the pins, which are in the form of small tubes.

The pin is preferably held at only one end, that is to say only at one of its ends. The saving of a second holder at its other end saves valuable space within the battery housing. The connection, which can be tightened mechanically, between the pin and the contact connection also means that the pin can be held robustly at one end.

A contact board may be provided in the area of the contact connection. This enlarges the surface area of the contact connection, and thus allows a better electrical connection for the appliance. The contact board may in particular be in the form of a printed circuit, which is provided entirely or partially with a conductive layer. The contact connection is advantageously gold-plated or nickel-plated in order to reduce the corrosion susceptibility and to improve the conductivity.

If the contact board is arranged in a depression in the housing, the external volume of the battery is reduced. Nevertheless, the mechanical robustness can be ensured by means of a mechanically robust connection, in particular an adhesively bonded connection, between the contact board and the housing located underneath it, by the contact board representing a load-bearing element of the battery housing. The arrangement of the contact board in a depression also avoids projecting parts which, for example, can lead to mechanical problems during use of the battery and can interfere with the handling of the battery.

The contact boards may have two mutually isolated contact connections. This solution is chosen in particular when the housing is, for example, a plastic housing and is thus floating, so that both a positive pole and a negative pole must be connected to a respective contact connection on the outside. The contact connections may, for example, be in the form of gold-plated or nickel-plated contact parts that are fitted to a printed circuit, but which are not conductively connected to one another. These contact parts, which are formed by the coated printed circuit, are then each fed by one pin via the respective connection which can be tightened mechanically.

For certain applications, it is useful for electronic components to be formed on the contact board. These may be integrated circuits, capacitors, resistors, coils, fuses or other components and may be used, for example, for matching to the appliance or for controlling battery charging and discharging. A design such a this can be provided in a particularly simple manner if the contact board is in the form of a printed circuit, so that the components can be fitted in a conventional manner for electronics, in particular being soldered.

Further advantageous embodiments and feature combinations of the invention will be found in the following detailed description and in the totality of the patent claims.

These and other objects and advantages of the invention will be apparent from the following description, the accompanying drawings, and the appended claims.

BRIEF DESCRIPTION OF THE DRAWINGS

In the drawings which are used to explain the exemplary embodiment:

FIG. 1A shows a schematic illustration of a conventional anode output conductor with a contact bushing by means of metal rivets;

FIG. 1B shows a schematic illustration of a conventional output conductor lug between a cathode and a housing;

FIG. 2A shows an exploded illustration of the screwed bushing of a battery according to the invention;

FIG. 2B shows an enlarged cross-sectional illustration of the screwed bushing;

FIG. 2C shows an illustration of a cross section through the screwed bushing, with the inner and outer electrical contacts;

FIG. 3 shows a schematic illustration in the form of a plan view of the outer face, provided with contact connections, for the battery according to the invention;

In principle, identical parts are provided with the same reference symbols in the figures.

DETAILED DESCRIPTION OF THE INVENTION

Figure 4:
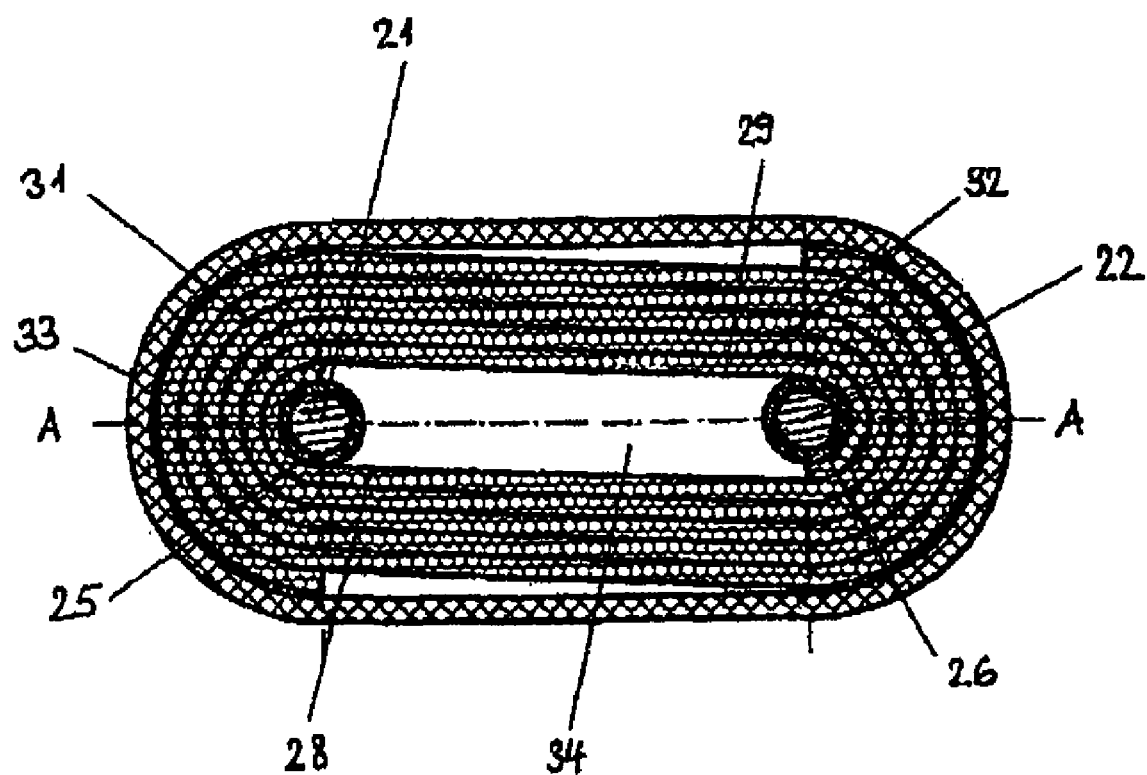
FIG. 4 shows an illustration of a battery according to the invention with a larger pin distance, in the form of a cross section parallel to the housing cover.

FIG. 1A shows a contact bushing from the anode to an outer contact surface, as is already in widespread use. The housing cover 13 is composed of metal and is conductively connected to the positive pole of the battery (see FIG. 1B). Its inner face is isolated from the content of the housing by an isolating plate 14. A contact rivet 11 is arranged in an opening in the housing cover 13, insulated by means of a non-conductive seal 12, in order to pass the negative pole to the outside of the battery. The rivet head on the outside of the housing and the bent-back rivet feet on the inside of the housing hold the contact rivet 11 in an interlocking manner. On the inside of the housing, the contact rivet 11 is connected on the rivet feet by means of a contact weld 15a to an output conductor lug 15 for the anode. The rivet head forms the externally accessible contact surface 11a. As can easily be seen, the illustrated arrangement has a considerable physical height H, which is due in particular to the insulation on the inside and outside of the housing cover 13, the isolating plate 14 and the seal 12.

FIG. 1B shows how contact is made with the conductive battery housing, as has generally been normal until now. An output conductor lug for the cathode is fitted to the metallic housing cup 16 by means of a contact weld 17a.

FIG. 2A shows a part of the cross section through a battery according to the invention with two contact connections. This is a battery with very small geometric dimensions and which, for example, has a height of only a few millimeters (for example up to 10 mm) and a width of a number of millimeters (for example 8 to 20 mm). Its energy capacity is generally 1 Ah or less. The battery housing 24 is composed of plastic, which is metalized to provide a vapor barrier. The gas-tight housing protects the electrolyte against air humidity. The battery housing 24 has two openings 24b, 24c, through which the output conductor pins or contact pins 25, 26 for the positive pole and negative pole, respectively, are screwed by means of conductive screws 21, 22. The screw heads rest on a printed circuit 23, which is arranged in a depression 24a in the upper face of the battery housing 24. In an upper part, the contact pins 25, 26 have cavities 25b, 26b with a thread into which the screws 21, 22 are screwed, while the lower part of the pins is solid.

FIG. 2B shows the contact bushings in detail. The heads of the screws 21, 22 make contact with mutually isolated contact surfaces 23a, 23b, which are in the form of conductive layers on the printed circuit 23. After insertion of the battery, the contact surfaces provide the electrical contact with the appliance which is supplied with current.

Furthermore, they make contact with the charger while the battery is being charged. The openings 24b, 24c in the battery housing 24 have additional recesses 24d, 24e at their lower end. These interact with corresponding broadened areas 25a, 26a on the output conductor pins 25, 26, which support the pins in the recesses. These broadened areas 25a, 26a are in the form of outer surfaces of the cavities in the contact pins 25, 26 which are bent outwards at an obtuse angle, so that a collar or a circular flange is formed. This leads to a larger contact surface area for the pins 25, 26 on the battery housing 24, and thus to greater mechanical robustness and to a better seal between the interior of the battery and the recesses in the battery housing 24. This figure also shows the reduced physical height H' in comparison to the conventional version illustrated in FIG. 1A. The physical height H' of the battery, according to the invention, is dependent only on the thickness and hence on the desired mechanical robustness of the battery housing 24, and the printed circuit 23 which is fitted to the battery housing 24 can contribute to the mechanical robustness if, for example, the printed circuit 23 is adhesively bonded to the battery housing 24. The contact pressure between the screws 21, 22 and the contact surfaces 23a, 23b, as well as the seal for the battery interior, can be enhanced or ensured by tightening the screws 21, 22.

The interior of the battery can additionally be sealed from the outside world by introducing an encapsulating compound 27 into the remaining intermediate spaces between the screws 21, 22, the openings 24b, 24c with the recesses 24d, 24e and the pins 25, 26. In this case, it is expedient for the configuration of the battery to use an encapsulating compound which cures after it has been introduced, so as to achieve the desired viscosity. For this purpose, the encapsulating compound may contain a solvent, may be curable by UV radiation or may include a catalyst which reacts with humidity in the air and thus leads to curing of the encapsulating compound. The encapsulating compound can thus be applied to the desired points before the screws are screwed in, and becomes firm after they have been screwed in. In addition to the additional sealing, a solution such as this provides the configuration with additional mechanical robustness and makes it impossible for the battery to be opened by the user (which may be dangerous in some circumstances). If it is not made impossible to open the battery by the introduction of an encapsulating compound 27, for example because various parts of the battery are intended to be disposed of or recycled separately, an encapsulating compound is chosen which remains viscous and thus does not fix the screw in the thread. In this case, if the encapsulating compound does not at the same time hold the screws firmly and thus prevent them from inadvertently becoming loose, a conductive spring washer may be provided between the screw head and the outer face of the battery housing. If an encapsulating compound is used, it is expedient for the recesses 24d, 24e to be shaped such that the encapsulating compound can surround the broadened areas 25a, 26a on all sides. This is the situation, for example, when (as is shown in FIG. 2B) the recesses 24d, 24e have a circular cross section in the plane of the inner surface of the battery housing 24 and have a recessed annular supporting surface, which is parallel to the inner surface but has a smaller diameter. The recesses taper uniformly in between. The broadened areas 25a, 26a which interact with the recesses 24d, 24e are shaped such that the collar is at an angle of approximately 45° to the outer surface of the contact pins 25, 26. The front part of the broadened areas 25a, 26a thus interacts with the recessed annular supporting surface, and provides a mechanically robust support. At the same time, the encapsulating compound 27 can surround the broadened areas 25a, 26a both on the inside and on the outside, and thus leads to the interior of the battery being sealed well.

If it is not intended to use encapsulating compound, there is no need for the recesses 24d, 24e, and the broadened areas 25a, 26a are in the form of flanges which are bent at right angles to the outer surfaces of the contact pins 25, 26 and rest on the inner face of the battery housing 24.

FIG. 2C shows the inner and outer contacts of the battery according to the invention. The metallic supporting strips 28, 29 which support the cathode and the anode, respectively, are welded directly to the contact pins 25, 26. The current flows from the electrodes via the contact pins and the screws to the contact surfaces 23a, 23b on the printed circuit.

FIG. 3 shows an external view of the upper face of the battery according to the invention. The battery housing 24 has a depression 24a in which a printed circuit 23 is arranged. Two physically separated and electrically isolated contact surfaces 23a, 23b are fitted to this printed circuit 23 and are electrically fed by means of two screws 21, 22. An electrically non-conductive section of the printed circuit 23 is located between the screws, and electrically isolates the two contact surfaces 23a, 23b from one another. The appliance which is supplied with power from the battery may make contact with the contact surfaces 23a, 23b by means, for example, of contact elements with a circular end face on the circular surface elements 23c, 23d. The illustrated arrangement is distinguished in that it is possible to make use of the majority of the upper face of the battery, even if the two output conductor pins are fitted very close to one another in the battery housing. This allows sufficiently large contact areas, even for very compact batteries. If electronic components or assemblies are intended to be fitted to the printed circuit 23, this is normally done on the non-conductively coated part—which may then be enlarged as appropriate.

FIG. 4 shows a cross section through a battery according to the invention with a similar configuration to the battery illustrated in FIGS. 2A, 2B, 2C and 3, but with a greater distance between the pins 25, 26. The cross section runs parallel to the housing cover, approximately along a line A-A (see FIG. 2C). A partially cylindrical internal area which is flattened in the form of a box is surrounded by the side wall 33. A supporting strip 28 which forms the cathode is spot-welded to the contact pin 25, and a supporting strip 29 which forms the anode is spot-welded to the contact pin 26. A separator strip 32 is wound between the two supporting strips and is impregnated with a suitable electrolyte, thus forming a compact winding 31. The winding is also held mechanically by the two contact pins, so that the contact pins are also used as a holding element for a wound electrode. The cavities in the contact pins 25, 26, which are in the form of small tubes, are filled by the screws 21, 22, which provide the electrical contact with the outside and fix the contact pins at one end on the housing cover. The area between the two contact pins 25, 26 does not contribute to the production of electrical power, because it is not filled with electrochemically active elements. This embodiment clearly shows that pushing the two contact pins back close together as shown in the embodiment of the invention illustrated in FIGS. 2A, 2B, 2C and 3 considerably reduces the size of this intermediate space 34, thus making it possible to considerably enlarge the actively useful volume.

The arrangement of the contact pins 25, 26 in the battery housing 24 is not restricted to the stated embodiment. The pins can be positioned so as to allow the electrochemically active wound electrode element to make optimum use of the space in the battery interior. If two or more contact pins are provided, these can also be fixed on different, for example opposite, outer faces of the battery housing, so that the contact surfaces are arranged on different faces. Note that the pins may be supported only on one end as illustrated.

Furthermore, the contact pins 25, 26 need not be supported on the housing cover via the described broadened areas 25a, 26a but may, for example, be supported by means of a thread that is provided in the housing cover, or by means of a nut which is fixed internally on the housing cover. The connection which can be tightened may also be formed by the contact pin being provided at its outer end with the thread, onto which a corresponding nut is screwed on the outside of the housing. A broadened area is provided on the contact pin on the inside of the battery housing, and supports the pin on the battery housing.

If the sealing of the battery housing is intended to be enhanced further, an encapsulating compound can also be applied between the printed circuit 23 and the battery housing 24. Its composition need not correspond to the composition of the encapsulating compound in the openings 24b, 24c and recesses 24d, 24e.

If a screwed bushing is provided, the screw heads may be recessed on the outside of the battery by providing appropriate cutouts in the battery housing 24 and, if appropriate, in the contact board 23. This avoids projecting battery parts, and can contribute to easier mechanical handling of the battery.

If, furthermore, the screw heads are used to make contact with a contact board 23, then it may be advantageous for the lower face of the screw head to be provided with a metallic coating, that is to say by way of example being nickel-plated or gold-plated, in order to produce a good electrical contact between the screws 21, 22 and the contact surfaces 23a, 23b.

As illustrated herein, note that the pins 25, 26 are accommodated in housing 24 in that two contact connections (21, 22, 23a, 23b) are provided on the outer face of the housing and are isolated from the housing 24 so that the housing 24 is floating.

In summary, it can be stated that the battery according to the invention has a space-saving design and has contact surfaces which make it easier to remove the battery from an appliance, and to reinstall it, frequently.

The invention claimed is:

1. A battery having in a housing at least one wound electrode element, the electrode of which being supported on a metallic supporting strip, and having inside said housing at least one pin for making contact with said at least one wound electrode element, and having at least one first contact connection which is fitted to an outer face of the housing and is electrically connected to said at least one pin which is arranged in said housing, wherein a second screw connection is formed between said at least one first contact connection and said at least one pin, whereas said at least one wound electrode element is wound directly around and directly supported by said at least one pin and said metallic supporting strip of said at least one wound electrode element is welded directly to said at least one pin, wherein said second screw connection comprises a screw, said at least one pin being held at only one end to the housing by said screw after said screw is screwed into a cavity of said at least one pin, wherein said at least one pin directly engages a wall of said housing, and wherein said at least one pin is supported in a recess of said wall of said housing.

2. The battery according to claim 1, characterized in that a head of said second screw connection forms said at least one first contact connection.

3. The battery according to claim 1, characterized in that said at least one first contact connection is composed essentially of gold or nickel, or is gold-plated or nickel-plated.

4. The battery according to claim 1, characterized in that said at least one pin comprises two pins that are accommodated in said housing, in that two contact connections are provided on said outer face of said housing and are isolated from said housing so that said housing is electrically floating.

5. The battery according to claim 1, characterized in that said at least one pin is at least partially in the form of a small tube with a broadened area at one end in order to support it on an inner wall of said housing.

6. The battery according to claim 1, characterized in that a contact board is provided in the area of said at least one first contact connection.

7. The battery according to claim 6, characterized in that said contact board is arranged in a depression in the housing.

8. The battery according to claim 6, characterized in that the contact board has two contact connections which are isolated from one another.

9. The battery according to claim 6, characterized in that electronic components are formed on the contact board.

10. The battery according to claim 1, characterized in that said at least one pin comprises two pins that are accommodated in said housing and two contact connections are provided on said outer face of said housing and are isolated from said housing so that said housing is electrically floating.

11. The battery according to claim 2, characterized in that said at least one pin comprises two pins that are accommodated in said housing and two contact connections are provided on said outer face of said housing and are isolated from said housing so that said housing is electrically floating.

12. The battery as recited in claim 1, characterized in that said at least one pin features a broadened area for contacting said housing.

13. The battery as recited in claim 1, characterized in that an energy capacity of the battery is 1 Ah or less.

* * * * *